UNITED STATES PATENT OFFICE.

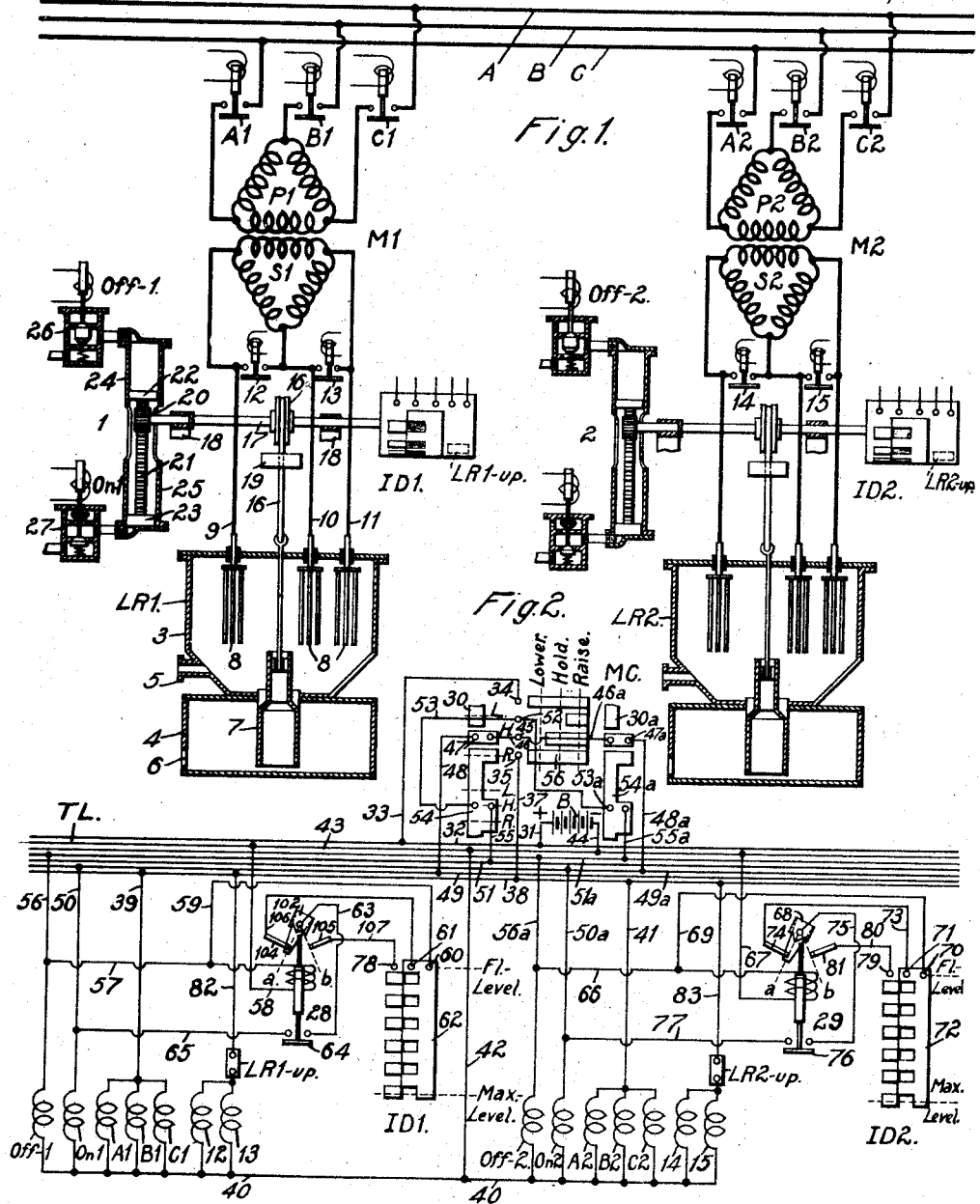

CHARLES C. WHITTAKER, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,281,730.  Specification of Letters Patent.  Patented Oct. 15, 1918.

Application filed August 7, 1916. Serial No. 113,460.

*To all whom it may concern:*

Be it known that I, CHARLES C. WHITTAKER, a citizen of the United States, and a resident of Wilkinsburg, in the county of Allegheny and State of Pennsylvania, have invented a new and useful Improvement in Systems of Control, of which the following is a specification.

My invention relates to control systems for dynamo-electric machines and especially to the control of induction motors which are governed by means of liquid rheostats or the like.

In systems of the above indicated character wherein electrically controlled, fluid-pressure-actuated operating mechanisms are employed for the liquid rheostats, more or less trouble has been experienced in the operation of electric railway vehicles or locomotives which employ a plurality of such operating mechanisms, by reason of the fact that the total effective fluid pressure and the friction of the moving parts varies considerably in the different mechanisms. Consequently, when the locomotive or vehicle operator attempts to effect a slight change in the liquid level in the various rheostats, some of the operating mechanisms move more rapidly than others and, therefore, do not identically vary the resistances of the circuit to be governed, as is desirable. After several such actions, it becomes necessary to individually balance the loads upon the several rheostats and motors by means of manually operated balancing switches, as fully set forth and claimed in a co-pending application of F. H. Shepard, Serial No. 784, filed January 6, 1915, and assigned to the Westinghouse Electric & Manufacturing Company.

One object of my invention is to provide a relatively simple system for obviating the above-mentioned difficulty by insuring that each rheostat-operating mechanism moves a predetermined increment whenever the master controller is temporarily moved to a certain position, as hereinafter more fully set forth.

In another co-pending application of F. H. Shepard, Serial No. 117,667, filed Aug. 30, 1916, and assigned to the Westinghouse Electric & Manufacturing Company, is set forth and claimed a system for performing the desired functions that employs a pair of alternately-operated relay devices in conjunction with other apparatus for concurrently actuating the above-mentioned fluid-pressure operating mechanisms in identical steps, in accordance with predetermined operation of the master controller. A further object of my present invention is to simplify the system just outlined in such manner that only one relay device is necessary in connection with each liquid rheostat for insuring the desired identical concurrent operation throughout the range of travel thereof.

My invention may best be understood by reference to the accompanying drawing, wherein Figure 1 is a diagrammatic view of the main circuit of a system of control embodying my invention; Fig. 2 is a diagrammatic view of the auxiliary governing circuits for the system of Fig. 1; and Fig. 3 and Fig. 4 are enlarged semi-diagrammatic views, in front and side elevation, respectively, of one piece of control apparatus that I employ in the operation of my invention.

Referring first to Figs. 3 and 4 of the drawing, the apparatus illustrated comprises a portion of the relay device 28 that is completely shown in Fig. 2 and embodies a suitable core member 100, to the upper end of which a thin flexible strip 101 of tempered steel, for example, is secured. A movable contact member or switch blade 102 is pivotally mounted upon a shaft 103 that is disposed a suitable distance directly above the flexible strip 101. The switch blade 102 is adapted to occupy two positions, marked *a* and *b*, wherein it makes contact with appropriate stationary contact members or control fingers 104 and 105, respectively, to which conductors 106 and 107 are respectively secured and are included in certain auxiliary circuits, as more fully described in connection with Fig. 2.

Assuming that the switch blade 102 occupies the illustrated position *a* and that the relay device 28 occupies its lower or inoperative position, upon energization of the actuating coil of the relay device from the master controller that is illustrated in Fig. 2, as hereinafter specifically set forth, the flexible strip 101 engages a notch or pocket 108 of the switch blade 102, and, consequently, actuates the blade to its alternate position $b$, wherein contact is made with the stationary finger 105, and such contact is frictionally maintained when the relay device returns to its lower position.

Assuming that the actuating coil of the relay device 28 becomes deënergized and is subsequently again energized, the flexible strip 101 will, at that time, engage another pocket or notch 109 of the switch blade 102 and, therefore, actuate the switch blade to the illustrated position $a$. It will be understood that, if desired, the pockets 108 and 109 may be formed in insulating material that surrounds the base of the switch blade 102, although such construction is not essential to the proper operation of my invention.

Thus, with each succeeding energization of the relay device 28 from the master controller, as set forth more fully later, the switch blade 102 is actuated to the alternate position to effect certain changes in circuit connections.

The principle involved in the apparatus shown in Fig. 3 and Fig. 4 is embodied in an apparatus that is fully set forth and claimed in my co-pending application, Serial No. 82,103, filed March 4, 1916.

Referring now to Fig. 1, the system shown comprises a suitable three-phase system embodying a plurality of supply-circuit conductors A, B and C; a plurality of driving induction motors M1, M2 which are provided with suitable primary windings P1 and P2 and secondary windings S1 and S2; a plurality of sets of primary switches A1, B1, C1, and A2, B2 and C2 for connecting the primary windings P1 and P2 to the respective supply circuit conductors A, B and C; a plurality of liquid rheostats LR1 and LR2 which are controlled by operating mechanisms 1 and 2, respectively, for governing the operation of the induction motors M1 and M2, as hereinafter more fully set forth.

Although, for the sake of simplicity and clearness, I have illustrated only two induction motors which may be disposed upon different cars of a multiple-unit train or upon different trucks of a single locomotive or other vehicle, it will be understood that the driving motors M1 and M2 are merely representative of any suitable driving member or driving unit, and the arrangement of such driving units is immaterial to my present invention, with the exception that the driving members are normally mechanically independent of each other.

The liquid rheostats LR1 and LR2 are identical in construction and may be of any suitable type. Each rheostat comprises a suitable operating tank 3 and a reservoir 4 disposed below the tank, an inlet opening 5 to the tank 3 and an outlet opening 6 from the reservoir 4, which may communicate with any suitable liquid circulating system (not shown); a combined discharge and regulating valve 7; and a plurality of suitably spaced electrodes 8 which are respectively connected to the terminals of the corresponding secondary induction motor winding by means of conductors 9, 10, and 11. The valve member 7 is adapted to permit the practically unrestricted flow of liquid from the inlet opening 5 to the reservoir 4 when occupying the illustrated position, and, when raised in the manner to be described, the level of the liquid in the operating tank 3 is correspondingly raised to gradually immerse the electrodes 8. The specific type of valve that is employed is immaterial to my present invention but I prefer to use the valve that is fully set forth and claimed in a co-pending application of A. J. Hall, Serial No. 873,919, filed Nov. 25, 1914, and assigned to the Westinghouse Electric & Manufacturing Company.

Switches 12 and 13 are provided for short-circuiting the rheostat LR1 when a predetermined liquid level marked "Maximum level" is attained and a similar function is performed by switches 14 and 15 with respect to the other liquid rheostat LR2.

A suitable cable or rope 16 is disposed around a pulley or sheave 16$a$ which is secured to a shaft 17 mounted in suitable bearings 18 and to the opposite ends of which an interlock drum ID1 or a like drum ID2 and a pinion member 20 are attached. A suitable counterweight 19 is secured to the free end of the cable 16 for substantially counterbalancing the weight of the valve member 7, as will be understood.

The operating mechanisms 1 and 2 severally comprise a reciprocatory rack member 21 which is adapted to mesh with the pinion 20 and to the opposite ends of which pistons 22 and 23 are suitably secured to operate within cylinders 24 and 25. Valves 26 and 27, which are, respectively, normally open and normally closed, are associated with the outer ends of the respective cylinders 24 and 25 to admit fluid pressure from any suitable source (not shown) to the cylinders, under predetermined conditions to be described.

The operation of the mechanisms 1 and 2, without regard to the specific electrical control thereof, may be set forth as follows: since the valve 26 is normally open, that is, in communication with the source of fluid pressure (not shown), the pistons 22 and 23 are biased to their lowermost positions, as illustrated in the drawing. To effect an upward movement of the pistons, the two actuating coils On—1 and Off—1 of the operating mechanism 1, for example, are simultaneously energized, whereby fluid pressure is admitted through the valve 27 to the lower cylinder 25 and is simultaneously exhausted to the atmosphere from the upper cylinder 24 through the closed valve 26. This reversal of normal fluid-pressure conditions effects the desired upward movement of the mechanism. To arrest such movement at any time, it is merely necessary to deënergize the Off—1 actuating coil, whereupon fluid pressure is again admitted to the cylinder 24, and a positive and reliable stoppage of the mechanism is obtained by reason of the balanced-pressure conditions in the cylinders 24 and 25. To effect the return movement of the mechanism, the two actuating coils Off—1 and On—1 are deënergized, whereby fluid pressure conditions revert to the original state and the mechanism is moved toward the illustrated position.

Referring to Fig. 2, the auxiliary governing system shown comprises, in addition to the actuating coils of the various switches and operating mechanisms that are shown in Fig. 1 and the contact members that are disposed upon the interlock drums ID1 and ID2, a master controller MC that is adapted to occupy a plurality of operating positions "Lower", "Hold" and "Raise", for correspondingly governing the operation of the several liquid rheostats, and, therefore, the several motors; a plurality of manually operated load-balancing switches 30 and 30a which are associated with the respective liquid rheostats in a manner to be described; a relay 28 which acts in conjunction with the interlock drum ID1 and the master controller MC to effect predetermined movement of the valve member 7 of the liquid rheostat LR1 under certain operating conditions; a similar relay device 29 which is employed in conjunction with the interlock drum ID2 and the master controller MC to perform a similar function with respect to the liquid rheostat LR2, whereby both rheostats are identically operated, as set forth more fully later; a plurality of train-line conductors TL of a familiar type for suitably interconnecting the master controller and the various other auxiliary governing circuits; and a suitable source of energy, such as a battery B, for energizing the various actuating coils.

Assuming that it is desired to effect acceleration of the driving motors M1 and M2, the master controller MC may be actuated to its final position "Raise", whereby one circuit is established from the positive terminal of the battery B through conductor 31, train-line conductor 32, conductor 33, control fingers 34 and 35, which are bridged by a contact segment 36 of the master controller, conductor 37, train-line conductor 38, where the circuit divides, one branch including conductor 39, the parallel-related actuating coils of the switches A1, B1 and C1 and conductor 40 and the other branch including conductor 41, the parallel-related actuating coils of the switches A2, B2 and C2 and conductor 40, whence a common circuit is completed through conductor 42, train-line conductor 43 and conductor 44 to the negative terminal of the battery B.

The several primary switches are thus closed to connect the primary induction-motor windings P1 and P2 to the respective supply-circuit conductors.

A further auxiliary circuit is completed from the contact segment 36 of the master controller through control finger 45, where the circuit divides, one branch including conductor 46, contact member 47 of the switching device 30, conductor 48, train-line conductor 49, conductor 50 and the actuating coil On—1 of the valve 26 to the negative conductor 40, and the other branch including conductor 46a, contact member 47a of the switching device 30a, conductor 48a, train-line conductor 49a, conductor 50a and the actuating coil On—2 of the liquid rheostat LR2 to the negative conductor 40.

Another auxiliary circuit is also completed from the contact segment 36 of the master controller through control finger 52, where the circuit divides, one branch including conductor 53, contact member 54 of the switching device 30, conductor 55, train-line conductor 51, conductor 56 and the actuating coil Off—1 of the valve 27, and the other branch including conductor 53a, contact member 54a of the switching device 30a, conductor 55a, train-line conductor 51a, conductor 56 and the actuating coil Off—2 of the liquid rheostat LR2 to the negative conductor 40. Since both actuating coils of each of the operating mechanisms 1 and 2 are thus energized, an upward movement of the pistons 22 and 23 occurs with a corresponding upward movement of the valve members 7 until a liquid level marked "Flush level", at which the tips of the electrodes 8 are just immersed, is reached, when acceleration of the induction motors M1 and M2 will begin.

Further upward movement of the valve members 7 and a consequent rise of the liquid levels may then be accomplished in any suitable manner to effect the desired rate of motor acceleration, since the movement of the valve members may be arrested at any time by merely actuating the master controller MC to its intermediate position "Hold", whereby the actuating coils Off—1 and Off—2 are deënergized and balanced fluid-pressure conditions obtain in the several operating mechanisms 1 and 2, as previously set forth.

If the motors M1 and M2 are substantially equally dividing the vehicle load, operation of the liquid rheostats to the maximum level may be effected in the manner just described. However, if, as is more or less usual, the motors do not equally divide the total load, by reason of unavoidable differences in the mechanical and electrical construction of the motors and of differences in the various driving-wheel diameters, any desired variation of the load taken by either motor may be obtained by suitably manipulating the corresponding switching devices 30 or 30a, which perform the same function with respect to the individual liquid rheostats as does the actuation of the master controller MC to its intermediate position "Hold," namely, the deënergization of the corresponding "off" coil to arrest the operation of the rheostat or, of course, the energization of both the "on" and the "off" coils or their deënergization, if desired, in accordance with the movement of the switching devices 30 and 30a to the corresponding position R or L, standing for "Raise" and "Lower," respectively. The individual balancing action just recited is fully set forth and claimed in the first above-identified copending application of F. H. Shepard and no further description is believed to be necessary here, inasmuch as such operation does not pertain directly to my present invention.

To effect equal increments of movement of the several valve members 7, the interlock drums ID1 and ID2, together with the corresponding relay devices 28 and 29, are employed in conjunction with the temporary movement of the master controller from the "hold" position to the "raise" position. Such equal increments, which correspond to substantially equal variation of resistance in the secondary circuits of the several motors are obtained in spite of the operating difficulties of differences in effective air pressures and friction in the various operating mechanisms, as previously more fully set forth.

Assuming that the switch blade 102 of the relay device 28 occupies the alternate position from that illustrated, viz., position b, and that a slight increase in the heights of the liquid in the several rheostats is desired, the master controller may be momentarily moved to its "raise" position and then may be returned to its "hold" position, whereupon the conductor 56, which is connected to the control finger 52 of the master controller, as hereinbefore described, is temporarily energized and a circuit is completed therefrom through conductor 57, the actuating coil of the relay device 28 and conductor 58, to the negative train-line conductor 43, thereby closing the relay device and actuating the blade 102 to the illustrated position a, in the manner previously described. A further circuit is thus completed from the positively-energized conductor 57 through conductor 59, control fingers 60 and 61 which are bridged by a portion of the contact segment 62 of the interlock drum ID1, conductor 106, stationary contact member 104 and switch blade 102, in its position a, of the relay device 28, conductor 63, the coöperating contact members 64 of the relay device 28 and conductor 65 to the conductor 50. Thus, the switch blade 102 is frictionally held in its position a even though the master controller is immediately returned to its "Hold" position, and the circuit just traced is maintained until the contact segment 62 of the interlock drum ID1 breaks contact with the control finger 61.

Thus, energy is supplied to both the On—1 and Off—1 actuating coils until the separation of the contact segment 62 from the control finger 61 of the interlock drum is effected.

A similar action takes place in the rheostat LR2, since a circuit is completed from the conductor 56a, which is connected to the control finger 52, through conductor 66, the actuating coil of the relay device 29 and conductor 67 to the negative train-line conductor 43. The resultant closure of the relay device 29 actuates the switch blade 68 to the illustrated position a, as was the case with the other relay device 28. A further circuit is thus established from the positively energized conductor 66 through conductor 69, control fingers 70 and 71, which are bridged by a portion of the contact segment 72 of the interlock drum ID2, conductor 73, stationary contact member 74 and switch blade 68 of the relay device 29, conductor 75, coöperating contact members 76 of the relay device and conductor 77 to the conductor 50a. The closure of the relay device thus bridges the conductors 50a and 56a in a manner similar to that described in connection with the relay device 28 and, consequently, the actuating coils On—2 and Off—2 are energized until the contact segment 72 of the interlock drum ID2 breaks contact with the control finger 71. Provided the corresponding teeth or projections of the contact segments 62 and 72 of the interlock drums ID1 and ID2, respectively, are equal in length, it will be understood that the valve members 7 of both the liquid rheostats LR1 and LR2 are moved substantially equal increments.

Upon the next momentary action of the master controller MC to the "raise" position for the purpose of effecting a slight increase in the heights of the liquids, the actuating coil of the relay device 28 is energized, as previously described, thereby actuating the switch blade 102 to its alternate position b. A circuit is thus completed from the conductor 59 through control fingers 60 and 78, which are bridged by a succeeding portion of the contact segment 62 of the interlock drum ID1, conductor 107, stationary contact member 105 and switch blade 102 of the relay device 28 and thence through conductor 63, as previously set forth. Thus, the actuating coils On—1 and Off—1 are again energized until the contact segment 62 of the interlock drum ID1 becomes disengaged from the control finger 78.

Simultaneously, a second circuit is completed from the conductor 56ª through conductor 66 and the actuating coil of the relay device 29, as hereinbefore described, whereby the switch blade 68 is actuating to its alternate position b, thus completing a further circuit from the conductor 69 through control fingers 70 and 79, which are bridged by a succeeding portion of the contact segment 72 of the interlock drum ID2, conductor 80, stationary contact member 81 and switch blade 68 of the relay device 29, and thence through conductor 75, as already traced.

Thus the actuating coils On—2 and Off—2 are energized until the contact segment 72 of the interlock drum ID2 breaks contact with the control finger 79, thereby insuring a movement of the valve member 7 corresponding to the liquid rheostat LR2 that is identical with the simultaneous movement of the other valve member 7.

Without further description, it will be understood that any desired increment of movement of the several valve members 7 may be simultaneously effected by the above described manipulation of the master controller MC. Of course, if the master controller is allowed to remain in its raised position more than momentarily, the previously described normal operation of the rheostats will result. The contact segment 62 and 72 are, of course, identical in construction and, as illustrated in Fig. 2, the various teeth or side projections are of the same length throughout the range of operation of the interlock drum, which is shown as corresponding to the distance between flush level and maximum level of the liquid rheostat, as indicated by the legends.

However, if it is desired to vary the size of increment of movement during the range of operation of the interlock drums, this result may be readily accomplished by the use of a contact segment upon the interlock drums of such configuration that the increment of movement gradually decreases in length, for example, as the interlock drum approaches its final position, or, in other words, the steps of operation of the liquid rheostat, corresponding to the teeth of the rheostat, corresponding to the teeth of the contact segments, are smaller when the liquid level approaches its maximum height than is the case when the liquid level is near the bottom of the operating tank 3. Of course, the variation in the increments of movement is not limited to the type just mentioned, any other desired variation being readily obtainable by suitably altering the configuration of the various contact segments that are associated with the respective liquid rheostats. However, such a construction is not of my invention, but is fully set forth and claimed in the second above-identified co-pending application of F. H. Shepard.

When the liquid height marked "Maximum level" has been obtained, it is customary to close the short-circuiting switches 12, 13, 14 and 15, although such operation is not essential to my present invention. The short-circuiting action just recited is effected in the illustrated system by the completion of a circuit from the train-line conductor 38 through conductor 82, interlock or contact member LR1—up, which is disposed upon the interlock drum ID1 and becomes operative only when the position corresponding to maximum liquid level has been reached (see Fig. 1), and the parallel-related actuating coils of the short-circuit switches 12 and 13 to the negative conductor 40. Similarly, a circuit is completed from the train-line conductor 38 to the conductor 83, interlock LR2—up, which is suitably disposed upon the interlock drum ID2, and the parallel-related actuating coils of the switches 14 and 15 to the negative conductor 40.

I have thus provided a system of the type under consideration whereby a plurality of liquid rheostats which are operated by fluid-pressure actuating mechanisms may be identically operated, irrespective of constructional or actuating differences in the respective operating mechanisms 1 and 2, by the use of a single relay device associated with each rheostat.

I do not wish to be restricted to the specific structural details or arrangements of parts herein set forth, as various modifications thereof may be effected without departing from the spirit and scope of my invention. I desire, therefore, that only such limitations shall be imposed as are indicated in the appended claims.

I claim as my invention:

1. In a system of control for a vehicle, the combination with a plurality of independent driving members, of independent means associated with each driving member for governing the operation thereof, and means embodying a single relay device associated with each governing means for insuring predetermined concurrent operation of the governing means under certain conditions.

2. In a system of control for a vehicle, the combination with a plurality of independent dynamo-electric machines, of independent means associated with each of said driving members for normally governing the operation thereof, and means embodying a single relay device associated with each governing means for effecting predetermined concurrent operation of the governing means under certain conditions.

3. In a system of control, the combination with a plurality of dynamo-electric machines, of ohmic resistance-varying means severally associated with said machines for normally independently governing the operation thereof, independent means associated with each of said resistance-varying means for controlling the operation thereof, and means embodying a single relay device associated with each governing means for insuring predetermined concurrent operation of the controlling means under certain conditions.

4. In a system of control, the combination with a plurality of independent dynamo-electric machines, of ohmic resistance-varying means for normally independently governing the operation thereof, independent movable means for severally controlling said resistance-varying means, and means in part operable with, and embodying a single relay device energized by, the respective movable means for insuring predetermined concurrent operation of the movable means under certain conditions.

5. In a system of control, the combination with a plurality of independent dynamo-electric machines, of ohmic resistance-varying means for normally independently governing the operation of said machines, movable means for severally controlling said resistance-varying means, a controlling device for effecting operation of all said machines, and means embodying a single relay device associated with each movable means and with said controlling device for insuring predetermined concurrent operation of the movable means under certain conditions.

6. In a system of control, the combination with a plurality of dynamo-electric machines, of resistance-varying means for normally independently governing the operation thereof, movable means for controlling said resistance-varying means, a controlling device for effecting operation of all said machines, and means severally mechanically operable with the respective movable means and embodying a single relay device electrically associated with said controlling device for insuring predetermined concurrent operation of the movable means under certain conditions.

7. In a system of control, the combination with a plurality of dynamo-electric machines, of resistance-varying means for normally independently governing the operation thereof, movable means for controlling said resistance-varying means, a controlling device for effecting operation of all said machines, and plural means for insuring predetermined concurrent operation of the movable means under certain conditions, said plural means comprising a contact-carrying member operable with each movable means and a single relay device for governing the connections of each contact-carrying member with said controlling device.

8. In a system of control, the combination with a plurality of dynamo-electric machines, of resistance-varying means for normally independently governing the operation thereof, electrically-controlled means for severally governing said resistance-varying means, a controlling device for effecting operation of all said machines, a plurality of contact-carrying members movable with the respective electrically-controlled means, a plural-position switching device for effecting energization of each electrically-controlled means in accordance with the relative positions of the associated switching device and contact-carrying members, and means for actuating the switching devices to their proper positions under certain conditions.

9. In a system of control, the combination with a plurality of dynamo-electric machines, of resistance-varying means for normally independently governing the operation thereof, electrically-controlled means for severally governing said resistance-varying means, a controlling device for effecting operation of all said machines, a plurality of contact-carrying members movable with the respective electrically-controlled means, a plural-position switching device for temporarily completing connections to each electrically-controlled means when the associated switching device and contact-carrying member occupy corresponding positions, and means governed by predetermined operation of said controlling device for concurrently actuating said switching devices to corresponding positions, whereby substantially identical operation of the several resistance-varying means is insured.

10. In a system of control, the combination with a plurality of driving induction motors, of a plurality of liquid rheostats for normally independently governing the operation thereof, electrically-controlled means for severally governing said liquid rheostats, a master controller for effecting operation of all said motors, a plurality of contact-carrying members movable with the respective electrically-controlled means, a two-position switching device for temporarily completing connections to each electrically-controlled means when the associated switching device and contact-carrier member occupy corresponding positions, and a plurality of relay devices governed by momentarily moving said master controller to a given position and adapted, upon each actuation, to operate said switching devices to the alternate position, the switching-device circuits remaining energized until the corresponding contact-carrying members occupy predetermined similar positions, whereby substantially identical operation of the several liquid rheostats is insured.

11. In a system of control, the combination with a plurality of dynamo-electric machines, of resistance-varying means for normally independently governing the operation thereof, and means associated with each resistance-varying means and adapted to alternately occupy two positions for effecting predetermined concurrent operation of the resistance-varying means under certain conditions.

12. In a system of control, the combination with a plurality of dynamo-electric machines, of resistance-varying means for normally independently governing the operation thereof, means for controlling said resistance-varying means, and means embodying a switching device alternately occupying its two positions and associated with each controlling means for insuring predetermined concurrent operation thereof under certain conditions.

13. In a system of control, the combination with a plurality of dynamo-electric machines, of resistance-varying means for normally independently governing the operation thereof, movable means for severally controlling said resistance-varying means, a controlling device for effecting operation of all said machines, and means embodying a switching device alternately occupying its two positions and associated with each movable means and with said controlling device for insuring predetermined concurrent operation of the movable means under certain conditions.

14. In a system of control, the combination with a plurality of dynamo-electric machines of resistance-varying means for normally independently governing the operation thereof, movable electrically-controlled means for severally controlling said resistance-varying means, a controlling device for effecting operation of all said machines, a two-position switching device for partially governing the concurrent operation of each electrically-controlled means, and a relay device governed by predetermined operation of the master controller for alternately actuating each switching device to its two positions.

In testimony whereof, I have hereunto subscribed my name this 27th day of July 1916.

CHARLES C. WHITTAKER.

Copies of this patent may be obtained for five cents each, by addressing the "Commissioner of Patents, Washington, D. C."